No. 627,179. J. D. DREESE. Patented June 20, 1899.
FISH HOOK.
(Application filed Apr. 10, 1899.)
(No Model.)
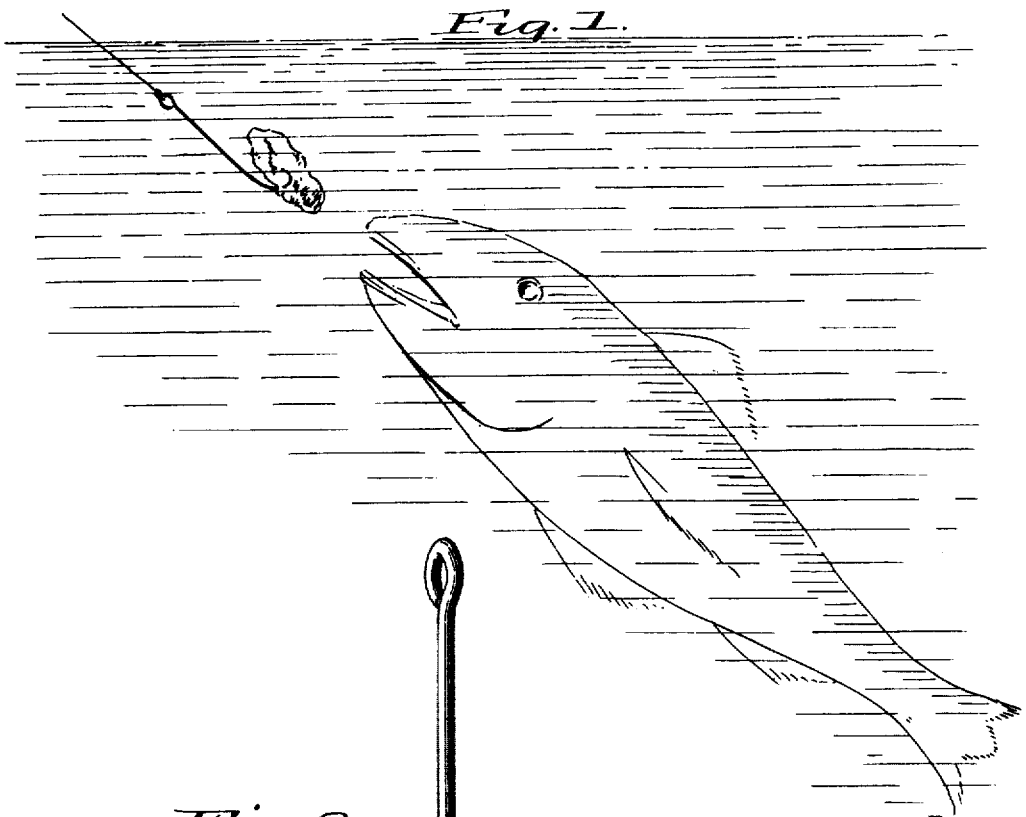
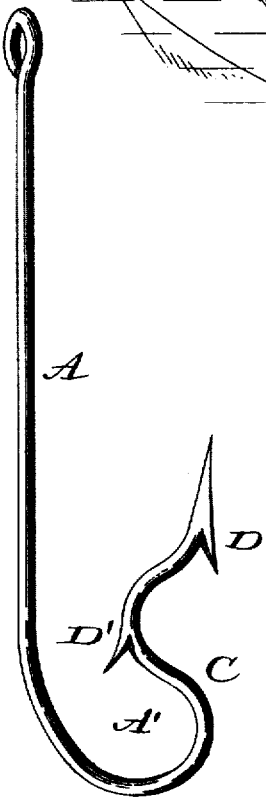

UNITED STATES PATENT OFFICE.

JOHN D. DREESE, OF HALSTEAD, KANSAS.

FISH-HOOK.

SPECIFICATION forming part of Letters Patent No. 627,179, dated June 20, 1899.

Application filed April 10, 1899. Serial No. 712,518. (No model.)

*To all whom it may concern:*

Be it known that I, JOHN D. DREESE, a citizen of the United States, residing at Halstead, in the county of Harvey and State of Kansas, have invented certain new and useful Improvements in Fish-Hooks; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in fish-hooks, and especially to a hook having a plurality of barbs so arranged on the hook as to render the hook more serviceable and make it less liable to become disengaged from the mouth of the fish than with hooks commonly used having either a single or more than one barb.

More specifically the present invention resides in the provision of a fish-hook having its short end bent in the shape of a compound curve, with one barb disposed in parallelism with the shank portion of the hook, while a second barb is formed on the inner side of the inwardly-curved portion of the hook, thereby making the hook more positive and insuring its secure engagement with the fish that may strike for the bait contained on and obscuring said barbs.

To these ends and to such others as the invention may pertain the same consists, further, in the novel shape and arrangement of the different parts of the hook, as will be hereinafter more fully described and then specifically defined in the appended claim.

My invention is clearly illustrated in the accompanying drawings, which, with the letters of reference marked thereon, form a part of this application, and in which drawings—

Figure 1 is a perspective view showing the hook baited and in actual use. Fig. 2 is an enlarged detail view of the hook, showing the peculiar shape of the curve and the location of the barbs.

Reference now being had to the details of the drawings by letter, A designates the shank of the hook, which is bent near one end in substantially S shape, as seen at A', and the extreme end of the short arm of the hook is bent upward or in a direction parallel with the shank or long arm of the hook. Near the bending-point of said tip, as at C, is formed the barb D, which is slightly curved, as shown, and on the inwardly-curved portion of the short arm is the barb D', which is downwardly disposed and points in a direction at an acute angle to the long arm of the hook or its shank portion.

By constructing a hook in accordance with my invention it will be noted that as the mouth of the fish passes over the end barb and against the inwardly-curved portion of the hook the lower end of the barb at the end of the hook will engage in the flesh as well as the barb on the curve, thus greatly increasing the chances of holding the fish.

I am aware that it is common in the art to construct a fish-hook having a plurality of barbs, and I make no claim for such a construction broadly.

Having thus described my invention, what I claim to be new, and desire to secure by Letters Patent, is—

A fish-hook having its short arm bent in substantially S shape with its end bent in a plane parallel with the shank portion of the hook and formed into a barb, and an integral barb formed on the curved portion of the short arm, said latter-referred-to barb being downwardly disposed and at an acute angle to the shank of the hook, as shown and described.

In testimony whereof I affix my signature in presence of two witnesses.

JOHN D. DREESE.

Witnesses:
M. HARTMAN,
R. O. STURDY.